July 17, 1928. 1,677,390
A. F. JONES
MACHINE FOR MAKING COVERED BOXES
Filed Oct. 22, 1926 6 Sheets-Sheet 1

Inventor:
Albert F. Jones,
by Wright, Brown, Quinby & Hay
Attys.

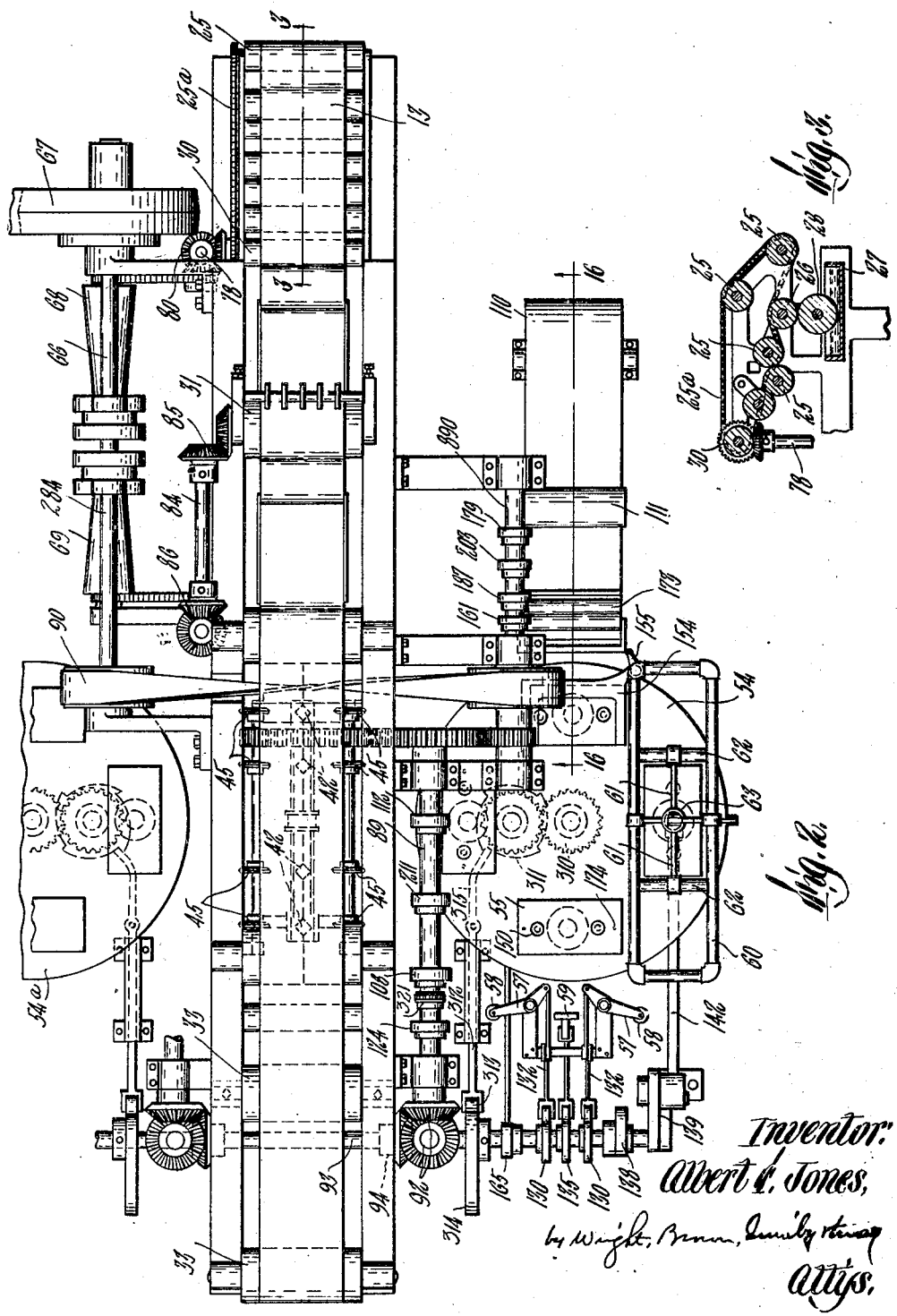

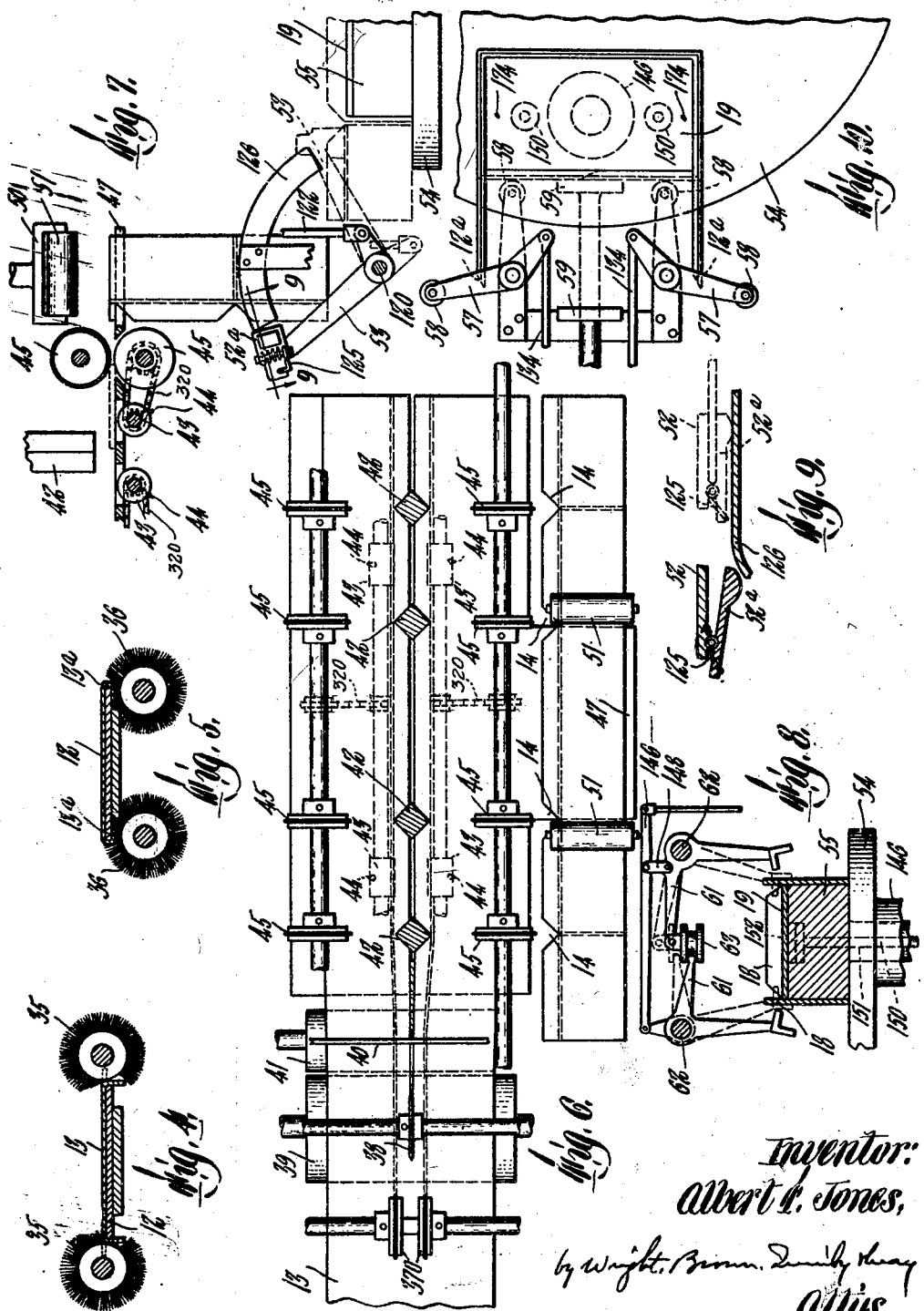

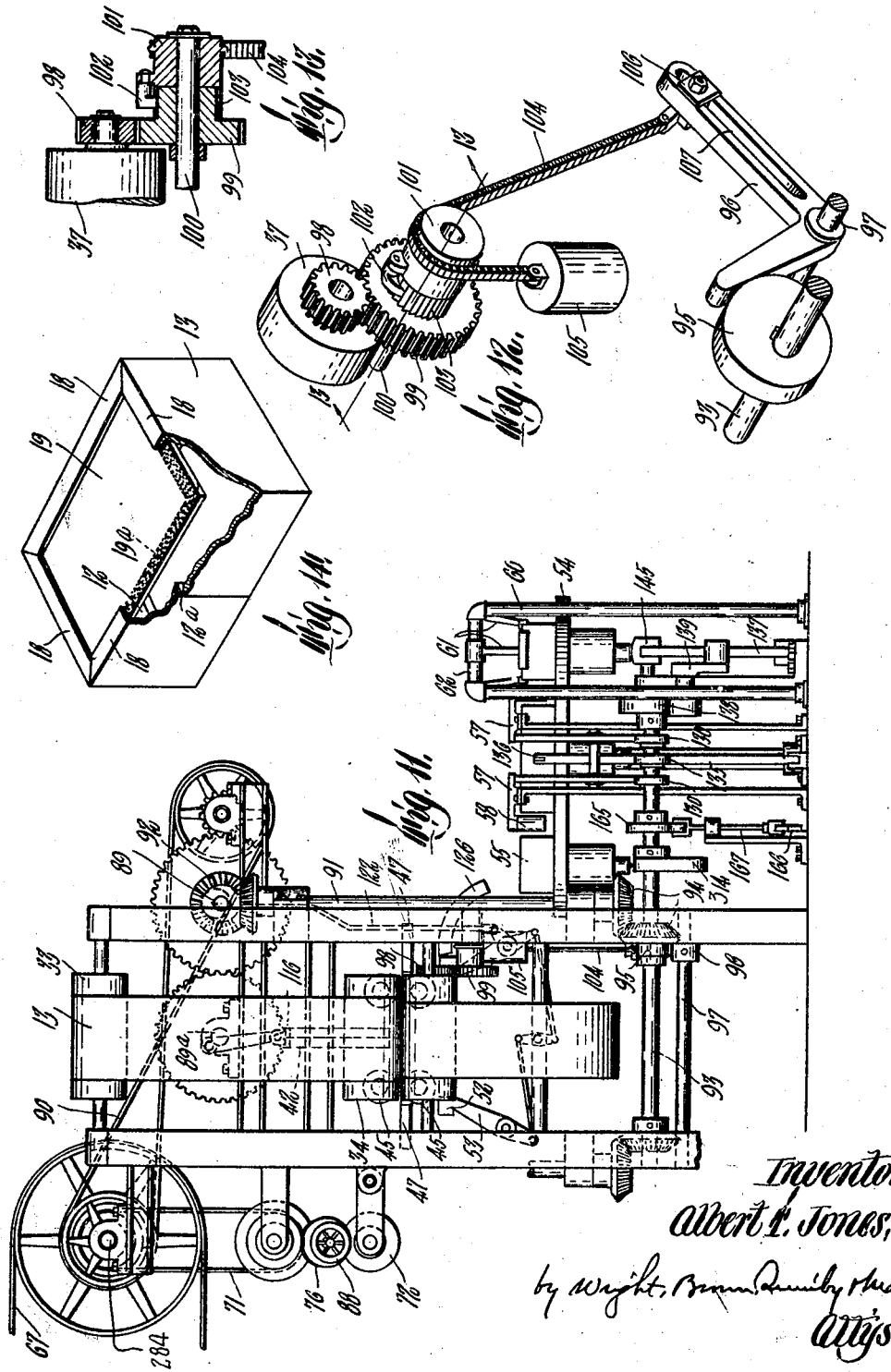

July 17, 1928.
A. F. JONES
1,677,390
MACHINE FOR MAKING COVERED BOXES
Filed Oct. 22, 1926
6 Sheets-Sheet 5
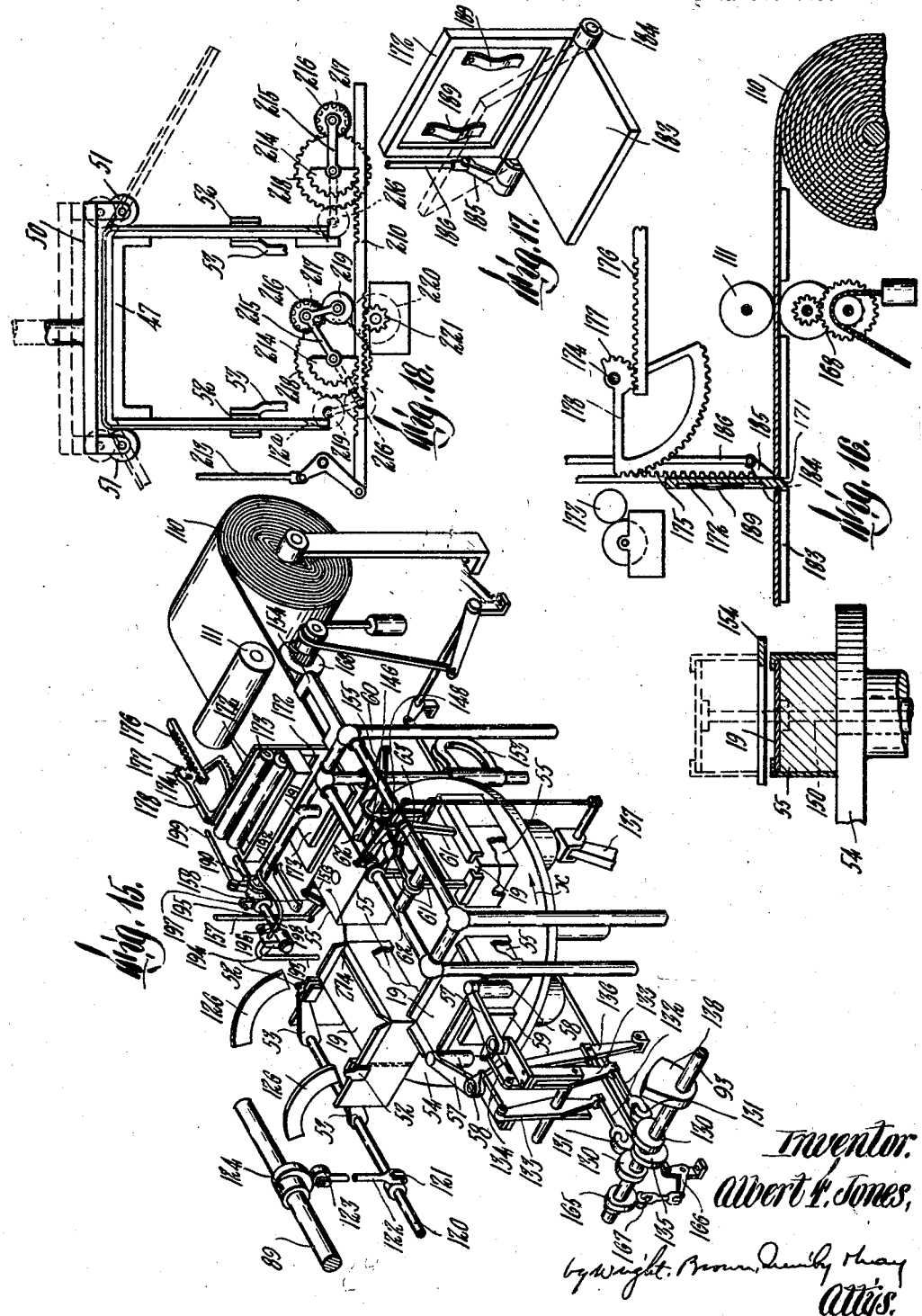

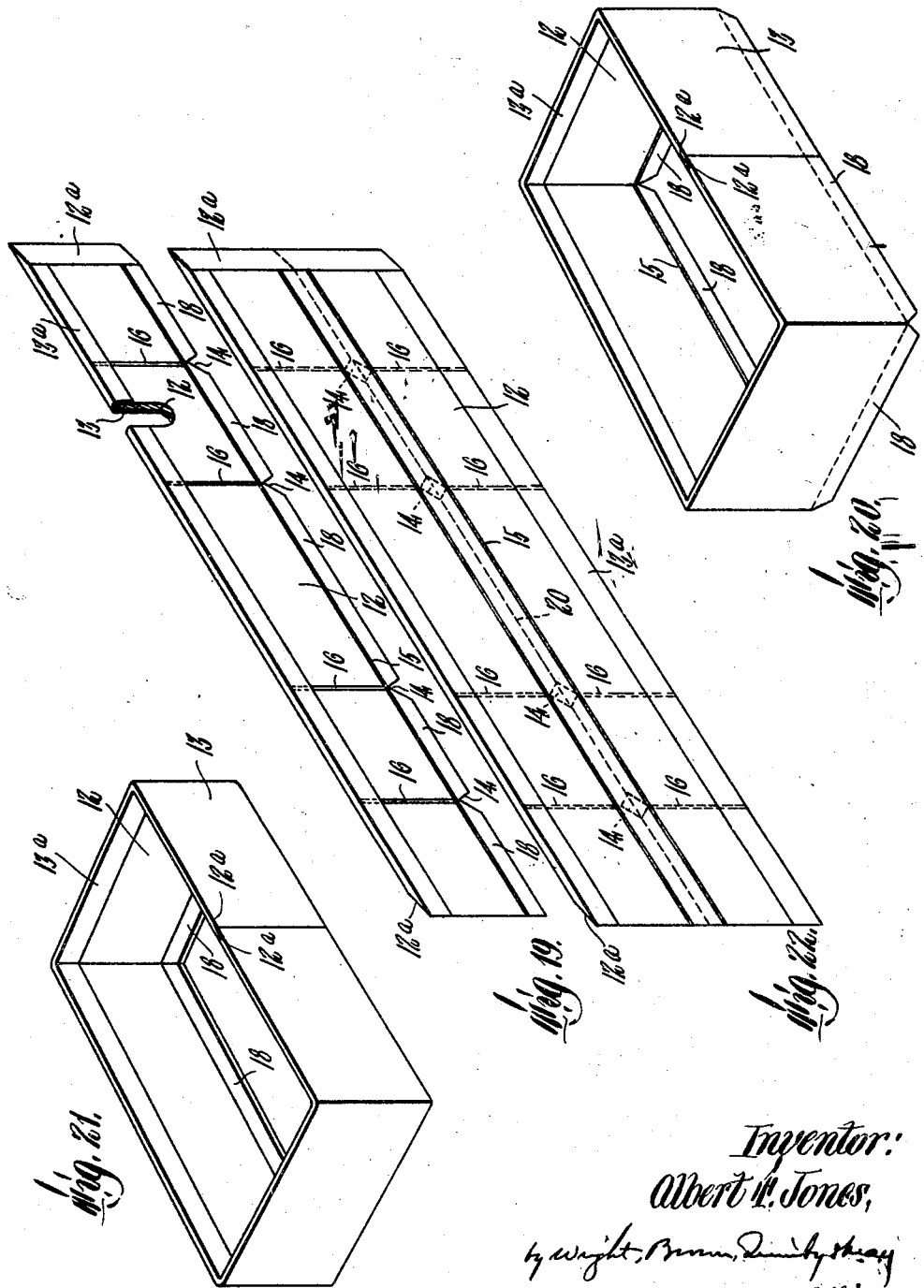

Patented July 17, 1928.

1,677,390

UNITED STATES PATENT OFFICE.

ALBERT F. JONES, OF SALEM, MASSACHUSETTS; MABEL J. DOWNS EXECUTRIX OF ALBERT F. JONES, DECEASED.

MACHINE FOR MAKING COVERED BOXES.

Application filed October 22, 1926. Serial No. 143,403.

This invention relates to the manufacture of the improved covered box disclosed by my application filed August 9, 1926, Serial No. 128,043. Said box comprises a body including four wall portions collectively forming a rectangular wall, and having inwardly bent flange sections collectively forming a flange projecting inwardly from the wall at the lower edge thereof, and a separately formed bottom seated and glued to the flange and bearing at its margin on the inner surface of the wall, the body being laminated and composed of a thick inner layer which includes the flange, and a thin outer layer covering the outer surface, the upper edge, and a portion of the inner surface of the outer layer, and the outer surface of the flange.

The object of the present invention is to provide a machine adapted to rapidly manufacture boxes characterized as above stated, and organized to produce an elongated laminated web, one layer being of box board and the other of thin finishing paper, sever the web into lengths, each constituting a blank for a single box body, convert each blank into a box body having an inwardly projecting flange at its lower edge, and secure the separately formed bottom to the flange, thereby completing a covered box.

Of the accompanying drawings forming a part of this specification,—

Figure 2 is a top plan view of the same.

Figure 3 is a section on line 3—3 of Figure 2.

Figure 4 is a section on line 4—4 of Figure 1.

Figure 5 is a section on line 5—5 of Figure 1.

Figure 6 is a section on line 6—6 of Figure 1, and a plan view of parts below said line.

Figure 7 is a section on line 7—7 of Figure 1.

Figure 8 is a section on line 8—8 of Figure 1.

Figure 9 is a section on line 9—9 of Figure 7.

Figure 10 is a top plan view, showing portions of the mechanism shown by Figure 2.

Figure 11 is an end view of the machine.

Figure 12 shows in perspective elements of the feeding mechanism hereinafter described.

Figure 13 is a section on line 13—13 of Figure 12.

Figure 14 is a perspective view, showing the completed box inverted, a portion of the body being broken away.

Figure 15 shows in perspective portions of the machine including the turret hereinafter described.

Figure 16 is a section on line 16—16 of Figure 2.

Figure 17 shows in perspective a portion of the mechanism for applying glue to the box bottom.

Figure 18 shows in elevation the mechanism for skiving the ends of the body blank.

Figure 19 is a perspective view, showing a body blank as produced by the machine before conversion into a box body.

Figure 20 is a perspective view, showing the blank as converted by the machine into a rectangular box wall, before the formation of the bottom-supporting flange.

Figure 21 is a view similar to Figure 20, showing the blank after the formation of the bottom-supporting flange and before the application of the bottom thereto.

Figure 22 is a view similar to Figure 19, showing a twin blank adapted to be converted into two blanks, each formed as shown by Figure 19, the machine being organized to produce the twin blank and sever it longitudinally into two duplicate blanks.

The same reference characters indicate the same parts in all of the figures.

Figure 1:
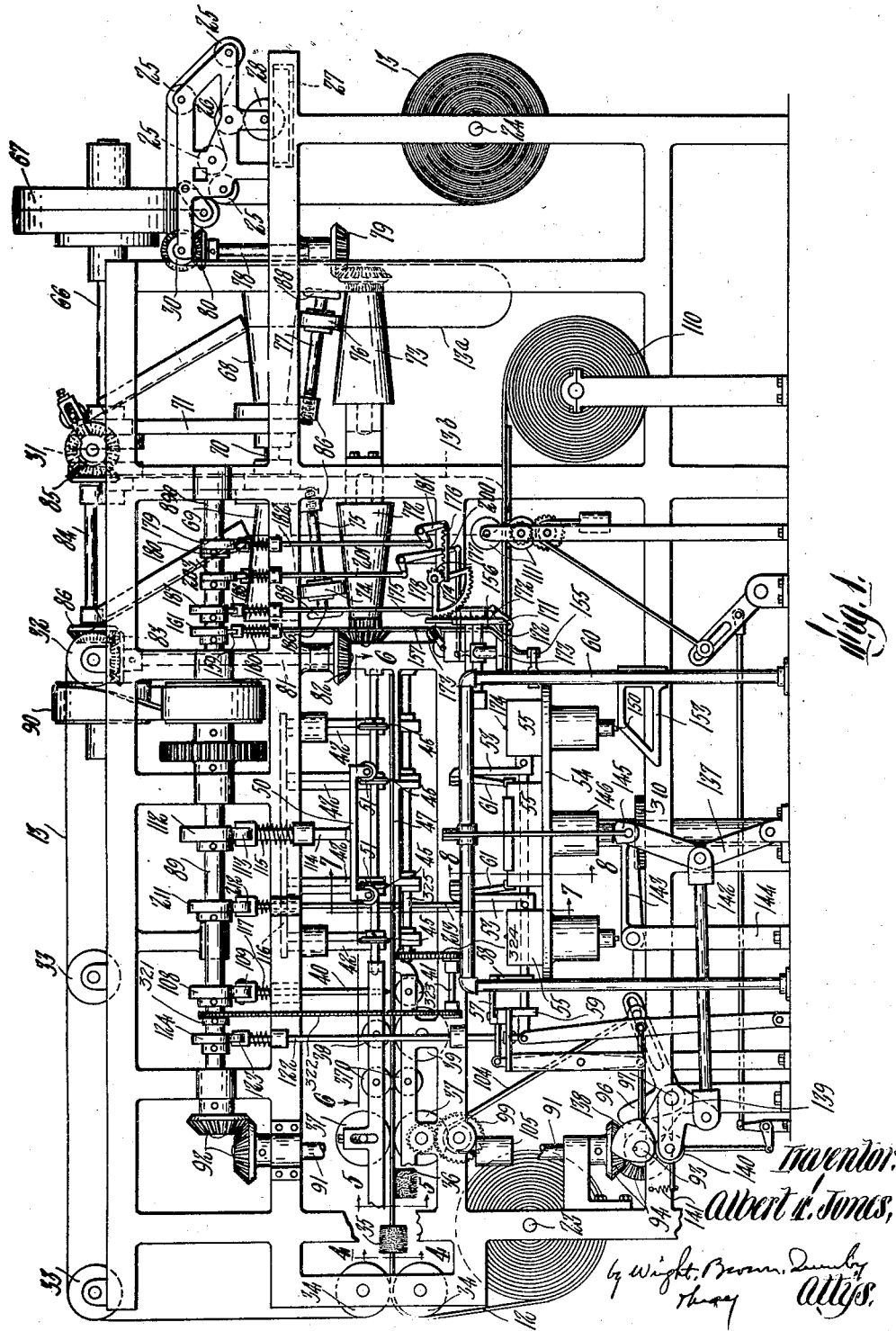
Figure 1 is a side elevation of a box-making machine embodying the invention.

The machine hereinafter described is adapted to produce the blank shown by Figure 19 and convert it into the box shown by Figure 14, by first cementing together an elongated relatively thick inner layer 12 of boxboard, and an outer layer or veneer of thin finished paper covering the outer surface of the inner layer, and having a flap 13$^a$ folded over the outer edge of the inner layer and against the inner side of the latter, providing the opposite ends of the inner layer with skived bevelled faces 12$^a$, 12$^a$, providing the inner edge of the blank with mitred notches 14, which form the ends of tabs or flange sections 18, providing the inner layer with a longitudinal crease 15, extending across the apexes of the notches to define a line on which the flange sections 18 may be bent, and with transverse creases 16, extending from the notches across the blank, there being two inner and two outer transverse creases, bending the blank at the transverse creases, and at the same time cementing together the skived faces 12ª to form a flush lap joint, bending the blank at the longitudinal crease 15, to cause the tabs 18 to project inwardly, as shown by Figure 21, and form a continuous bottom-supporting flange, and cementing a rectangular bottom 19 to said flange, the margin of the bottom bearing on the inner sides of the wall formed by bending the blank.

The machine is preferably a twin machine, adapted to produce the twin blank shown by Figure 22, and convert the same into two blanks, each formed as shown by Figure 19, by longitudinally severing the twin blank on the dotted line 20, (Fig. 22) the mitred notches 14 being cut in the proximate edges of the two blanks.

I will now describe the machine with reference to its organization whereby the twin blank shown by Figure 22, is produced and converted into two boxes, although the machine may be organized to produce only the single blank shown by Figure 19, and convert it into a box.

A web 12 (Figure 1) of boxboard is rolled on a reel 23, journaled loosely in bearings at one end of the frame of the machine. A web 13 of thin covering paper is rolled on a reel 24, at the opposite end of the frame, the web 13 being wider than the web 12, as shown by Figures 4 and 5. The web 13 is guided by continuously driven rolls 25, (Figures 1 and 3) over a continuously driven glue roll 26 which coats one side of the web with glue transferred from a tank 27 to the glue roll by a roll 28. The rolls 25 and 26 are continuously driven by a sprocket chain 25ª (Fig. 3) engaging sprocket wheels in said rolls and driven by a sprocket wheel fixed to the roll 30, which is driven by means hereinafter described. The coated web passes from the rolls 25 to a continuously driven roll 30, from which a depending bight 13ª of the web extends to another continuously driven roll 31. Another bight 13ᵇ of the web extends from the roll 31 to an idle roll 32. The web is guided from the roll 32 by idle rolls 33 to the nip of a pair of idle pressure rolls 34. The bights provide loose portions in the web which are partially taken up by the intermittently driven feed rolls 37, engaging and intermittently feeding the laminated web. The boxboard web 12 passes from the reel 23 to the nip of the pressure rolls 34 whereby the webs are pressed together. The arrangement of the rolls which guide the web 13 is such that the edges of the web 13 overhang the edges of the web 12, so that they may be subsequently folded, as indicated by Figures 4 and 5, to form the flaps 13ª (Fig. 22). The laminated web formed by the union of the webs 12 and 13, passes horizontally from the pressure rolls 34, and is acted on first by rotating upper and lower brushes 35 and 36 (Figs. 1, 4 and 5) which fold the flaps 13ª, so that the outer edges of the web are finished, then by creasing rolls 370, which form the longitudinal creases 15 (Fig. 22), then by a rotary slitting cutter 38 which co-operates with a bed roll 39 in longitudinally dividing the web on the line 20 (Fig. 22), and then by a cutting knife 40, which co-operates with a bed roll 41, in transversely severing the web and separating therefrom two body blanks. These blanks now lie close together, edge to edge, and are advanced into the path of four reciprocating punches 42, of rectangular cross section which form the mitred notches 14 (Figs. 19 and 22).

The blanks are next moved edgewise outwardly in opposite directions, for subsequent treatment, by driven feed rolls 43 (Fig. 6) having spurs 44, which engage the under sides of the blanks. As the subsequent treatment of each of the two blanks is the same, it will be sufficient to describe the treatment of one blank.

The blank is forced by the feed rolls 43 between upper and lower creasing rolls 45, which form the transverse creases 16 (Figs. 19 and 22), the lower creasing rolls 45 being positively driven, so that the blank is transferred to a fixed table 47 (Figs. 6 and 18). The feed rolls 43 are connected to the lower creasing rolls 45 by a sprocket chain 320, and the rolls 45 are rotated by mechanism comprising a sprocket 321 fixed to the shaft 89, a chain 322 connecting the sprocket 321 with a shaft 323 and a chain 324 connecting the shaft 322 with the lower creasing roll shaft 325. The blank is longer than the table 47, as shown by Figure 7, and the blank is so deposited that its end portions project from the table, as shown by dotted lines in Figure 18.

A vertically reciprocating head 50, carrying a pair of spaced apart bending rolls 51, now descends from the dotted line to the full line position shown by Figure 18, and bends down the projecting portions of the blank, as shown by full lines, the bends being on the two inner transverse creases 16 (Fig. 19) or those nearest the midlength of the blank.

After the blank is bent, the downwardly bent portions are grasped by fingers 52 (Figs. 15 and 18) on swinging arms 53, which are first held in position to confine the bent portions as shown by Figure 18, for the action of mechanism hereinafter described which skives the ends of the blank to form the lap joint faces 12ª, and applies glue to one of said faces. After the ends of the blank are thus treated the arms 53 and fingers 52, now grasping the bent blank, are swung to the position shown by Figure 15 to transfer the blank to a rotary turret 54. The turret is rotated step by step, by means hereinafter described and is provided with four blocks or forms 55, each of which is successively brought into position to receive the partially bent blank, as shown at the upper left hand portion of Figure 15. In Figure 15 portions of the forms are shown by breaking away portions of the box material thereon. I will describe the operation with reference to one of the forms. The form is first held in the upper left hand position shown by Figure 15, this being called the first position. On each form is deposited by means hereinafter described, a box bottom 19. After the arms 53 swing back to release the blank, the turret is partly rotated in the direction of arrow $x$ to carry the form to the lower left hand position shown by Figure 15, this being called the second position, and is arrested when the form is in this position. The outwardly projecting portions of the blank are then bent inwardly against the form, on their outer transverse creases 16, nearest the ends of the blank, one being bent in advance of the other, so that one of the skived faces $12^a$ overlaps and is pressed against the other, said faces being united by a glue coating on one face. This is accomplished by a pair of oscillating arms 57, having downwardly projecting bending rolls 58 which bend the blank ends against the form, and a reciprocating platen 59 which is projected against the ends of the blank and presses the skived faces closely together.

The turret is then rotated to bring the form to the lower right hand, or third position, shown in Figure 15, and arrested with the form in this position, the box-body being now in the condition shown by Figure 20, the flange tabs or sections 18 projecting above the form.

A frame 60 carries four swinging arms 61 which are pivoted on the rods 62 of the frame. The arms are provided with abutment strips which engage the upstanding flange sections 18 and bend the same inward against the box bottom 19, said bottom having been previously provided with a marginal coating $19^a$ of glue as shown by Figure 14. The arms 61 are also provided with inwardly projecting fingers which provide means for swinging the said arms. To the end of the projecting fingers on one of the arms is pivoted a circular block 63 with a concentric recess formed midway of its length. The ends of the three other fingers engage the recess in the block, so that an upward movement of the block causes a firm pressure of the flange sections against the bottom as shown by Figure 21. The box-body and bottom now constitute a completed box. The form carrying the completed box is carried by the next partial rotation of the turret to the upper right hand position shown by Figure 3, and the box is removed from the form as hereinafter described.

The web 110 used for making the bottoms is rolled and supported as shown in Figures 15 and 16, and drawn off step by step by feeding rolls 111 operated like the rolls 37 which feed the laminated body web. From the feeding rolls the bottom web is carried to a knife 171 which cuts a box bottom from the web and the bottom is acted on by a gluing plate 172, whereby glue is applied at $19^a$ to the box bottom. The box bottom is now raised by a suction plate 173 and deposited on the form 55 shown in the upper right hand or fourth position in Figure 15. Pointed spurs 274 are partially embedded in the forms which secure the bottoms against lateral movement on the froms while the turret is rotating.

It will be undestood that while a box is being made as above described, another box is being made, the machine comprising another turret $54^a$ (Fig. 2), and mechanism which is a duplicate of that above described for completing another box on the last-mentioned turret, one of the two blanks into which the laminated web is severed, being delivered to and formed on one turret, while the other blank is being delivered to and formed on the other turret, so that maximum rapidity of production is ensured.

If a flush lap joint is not desired, the grinding wheels 216 may be omitted. If the flap $13^a$ on the covering layer constituting a finish for the outer edge of the box is not desired, the brushes 35 and 36 may be omitted, the flap being also omitted.

I will now describe the means shown by the drawings for imparting motion from a source of power to the various machine elements above described.

The main drive shaft 66 (Figs. 1 and 2) may be driven by a belt running on a pulley 67 fixed to the shaft. The rolls 25, 30 and 31 which feed the covering web 13 may be driven at a variable speed by mechanism including a pair of upper cone pulleys 68 and 69 fixed to a shaft 70 (Fig. 1) journaled in bearings on the frame, a belt 71 running on pulleys on the shafts 66 and 70, lower cone pulleys 72 and 73 fixed to shafts journaled in bearings on the frame, a torque-transmitting friction roll 74 interposed between the cone pulleys 69 and 72 and rotatable on a longitudinally adjustable axle 75, a torque-transmitting friction roll 76 interposed between the cone pulleys 68 and 73 and rotatable on a longitudinally adjustable axle 77, a vertical counter shaft 78 having a bevel gear 79 meshing with a gear fixed to the cone pulley 73 and a gear 80 meshing with a gear fixed to the feed roll 30, a vertical counter shaft 81 having a bevel gear 82 meshing with a gear on the cone pulley 72 and a gear 83 meshing with a gear 86 on another counter shaft 84 having a gear 85 meshing with a gear fixed to the feed roll 31. This mechanism is adapted to vary the speed of the feed rolls so that bights 13$^a$ and 13$^b$ of any desired length may be maintained, by longitudinally adjusting the axles 75 and 77 and thus adjusting the friction rolls 74 and 76 relative to the cone pulleys. Said axles have threaded end portions engaging tapped sockets in fixed bosses 86 on the frame, the axles being provided with hand wheels 88 whereby they may be rotated.

The web-assembling and blank-making means, and the blank-forming and box-completing means may be operated as next described.

89 designates a secondary drive shaft driven by the main or primary drive shaft 284 through a belt 90 running on pulleys fixed to said shafts. A vertical counter shaft 91 (Fig. 1) is driven by the shaft 89 through gears 92 and drives a horizontal counter shaft 93 through gears 94. A cam 95 (Fig. 12) fixed to the shaft 93 bears on a bell crank lever 96 fulcrumed on a rod 97 and is an element of means for intermittently rotating the lower pressure roll 37 to cause the two rolls 37 to feed forward the laminated web step by step. The lower roll 37 has a gear 98 meshing with a gear 99 adapted to rotate in one direction only on a rock shaft 100 (Fig. 12). The rock shaft is provided with a pulley 101 having a pawl 102 engaging a ratchet 103 fixed to the gear 99. A sprocket chain 104 fixed at one end to the bell crank lever 96 and having at its free end a weight 105 engages sprocket teeth on the pulley 101, the weight and chain holding the lever 96 yieldingly against the cam 95 so that the lever is oscillated and rocks the pulley 101 causing the pawl 102 to intermittently rotate the gear 99 and the lower feed roll 37, the laminated web being therefore fed forward step by step a distance equal to the length of a blank. This distance may be varied by adjusting a slide 106 with which the chain 104 is connected, in a slot 107 in the bell crank lever 96.

The secondary drive shaft 89 is provided with a cam 108 against which a roll 109 journaled in a rod or plunger carrying the severing cutter 40, is pressed by a spring 117 so that the rotation of the shaft 89 causes a vertical reciprocation of the cutter.

The secondary drive shaft is provided with another cam 112 against which a roll 113 journaled on a rod or plunger 114 is pressed by a spring 115. To the plunger 114 is fixed a yoke 50 carrying the preliminary bending rolls 51. A head 116 carrying the punches 42 which form the mitred notches in the blanks is reciprocated vertically by means of a crank on the shaft 89$^a$ geared to the secondary shaft 89.

In Figure 18 is shown the mechanism for skiving the ends of the downwardly bent ends of the blank and applying glue to one skived end. A rack 210 is reciprocated by a cam 211 on the shaft 89 through the roll 212 and rod 213, and meshes with geared segments 214 to which are fixed arms 215 carrying abrasive grinding rolls 216 rotatably mounted at their ends. The rolls 216 rotate by gears 217 and 218 when the segment is rotated and skive the ends of the blanks which are placed in the path of the rolls as they take the position shown by dotted lines. To one of the arms 215 is pivotally mounted a glue roll 219 arranged to follow an abrasive roll as it describes its arc of oscillation. This roll rests on a roll 220 arranged to turn in a glue container when the parts are in the full line position as shown, and has a film of glue applied thereto which it deposits on a skived end of the blank when rotated. The rack 210 has teeth cut in its lower surface which rotates a gear 221 fixed to the roll 220.

A shaft 120 has fixed thereto the swinging arms 53 and a crank 121. A rod 122 is fastened at one end to the crank and carries a roller 123 journaled in the opposite end. A cam 124 against which the roller is pressed by means of a spring reciprocates the shaft 120 and the arms 53.

The fingers 52 are pivotally connected to the arms 53 and the gripping ends normally held apart by a spring 125, shown in Figure 9. A cam 126 fixed to the frame is placed in the path of the fingers as the arms reciprocate, and arranged to press the finger 52$^a$ inward as the downwardly bent portion of the box blank is approached by the gripping ends of the fingers. As the fingers 52$^a$ are pressed inwardly, they grip the blank and hold it until the end of the cam 126 is reached, when they are released. The box blank is now in position over a form 55 on the turret and is left thereon when the fingers 52 are opened.

The oscillating arms 57 are driven by cams 130 fixed to the horizontal shaft 93 against which rollers 131 journaled in rods 132 are pressed and connected by levers 133 and rods 134 to the arms. The cams 130 are arranged so that one arm 57 moves in advance of the other to cause one skived face 12$^a$ to overlap the other.

The platen 59 is reciprocated by a cam 135 fixed to the shaft 93 through a lever 136 and connecting rods.

The form 55 is raised by toggle arms 137 which are operated by a cam 138 fixed to the shaft 93. A bell crank lever 139 pivoted at its center is journaled at one end to receive a cam roll 140 which is held against the cam 138 by a spring 141, and attached at the other end to a rod 142. This rod connects the bell crank lever to the toggle arms, so that as the cam 138 rotates, the toggle arms are caused to straighten out and push upwardly on the form 55. The upper toggle arm is supported by an arm 143 and standard 144 and carries a shoe 145 which presses against the projecting end of the form. The form is slidably fitted in the turret by means of a guide 146. The shoe 145 has attached thereto a rod which is connected to the swinging arm 61 by a lever 146 pivoted at 148 to the frame 60. The lever is connected to the arm 61 by a link 148, so that as it is lifted by the upward movement of the toggle arms, the arm 61 and block 63 are also lifted so that the other arms 61 swing inward to apply pressure to the flange sections 18 of the box and the bottom piece 19.

For removing the finished box from the form, stripper rods 150 are arranged to slide vertically in guides 151 in the form and have heads 152 formed on their upper ends, said heads normally lying below the surface of the form, but arranged to project above the surface of the form a distance somewhat greater than the height of the box. A cam 153 pivoted on a leg of the frame 60 is caused to swing under the lower ends of the stripper rods to elevate them. Fixed to the cam 153 is a carrier 154 and a driving mechanism consisting of a crank member 155, a connecting rod 156, a push rod 157 connected to the rod 156 by a bell crank lever 158, a cam roll 159 journaled in the upper end of the rod 157 and pressed by a spring 160 against a cam 161 fixed to the drive shaft 890. Rotation of the cam 161 swings the cam 153 under the stripper rods 150, and as they raise the finished box above the form, the carrier swings inwardly beneath the box, and the strippers are lowered, allowing the box to rest on the carrier which then swings back so that the box may be removed by the operator or deposited on a conveyor.

A cam 165 fixed to the shaft 93 bears on a bell crank lever 166 fulcrumed on a rod 167 and is an element of means for intermittently rotating the lower pressure roll 168 to cause the two rolls 168 to feed forward the bottom material step by step. This mechanism is a duplicate of that described for intermittently feeding the laminated web and shown in Figures 12 and 13.

The glue plate 172 is arranged to reciprocate vertically past a glue roll 173, motion being applied by mechanism consisting of a gear segment 178 pivoted to the machine frame at 174, the teeth meshing with a rack 175 fixed to one side of the glue plate, a rack 176 meshing with a pinion 177 fixed to the gear segment, and a cam 179 fixed to the shaft 89 which drives the rack 176 through a cam roll 180, bell crank lever 181 and connecting rod 182. The lower edge of the glue plate has fixed thereto a cutting knife 171 which severs the bottom material when the plate has reached its lowest position as shown in Figure 16. A swinging plate 183 to press the bottom strip against the vertical glue plate, is pivoted at 184 and caused to swing upwardly by a crank 185 connected through a rod 186 and cam roll 188 to a cam 187 fixed to the shaft 890. To prevent the bottom strip from sticking to the glue plate after it has been pressed against it by the swinging plate, stripper springs 189 are fixed to the glue plate.

The suction plate 173 is connected to a sliding block 190 by a tube 191, and is reciprocated longitudinally with the feed of the bottom material. A cam 192 interposed in the path of the tube, raises the tube and suction plate and lowers them when the end of the cam is reached. An air suction pipe 193 is connected at one end with a suction pump (not shown) and at the other end with a valve 194 fixed to one end of the guide 195 on which the block 190 is slidably mounted.

A tube 196 is attached to the valve 194 and tube 191. A projecting arm 197 fixed to the sliding block 190 presses against a plunger 198 mounted in the valve 194 when the suction plate has been moved to the extreme forward position, that is directly over the form 55. A constant suction is maintained in the tube 193 and when the plunger 198 is not pressed in, a suction is also maintained in the tube 191. The bottom strip after being coated on its margin 19ª with glue is drawn up against the suction plate and carried to a position over the form. The arm 197 presses against the plunger 198 which cuts off the suction in the tube 191 allowing the bottom strip to be placed on the form and pressed on the spurs 274 which hold it securely. The sliding block 190 is reciprocated by a rod 199, bell crank 200, rod 201 and cam roll 202 which presses against a cam 203 fixed to the shaft 890.

The turret 54 is rotated step by step by mechanism including a gear 310, fixed to the axis of the turret, geared to a four-tooth ratchet 311, and a push rod 312, journaled at one end for a cam roller 313, which presses against a cam 314, fixed to the shaft 93. The opposite end of the push rod is pinned to a pawl 315, which presses against a tooth of the ratchet and indexes the ratchet a quarter of a revolution each time the cam rotates.

I claim:

1. A box-making machine comprising mechanism for making from a body web of boxboard and a covering web of thin paper, a flat laminated body blank having mitred notches in its inner longitudinal edge, a longitudinal crease cooperating with said notches to define bendable flange sections, adapted to form a continuous internal flange, and end portions adapted to overlap and form a lap joint; said mechanism including means for uniting the body and covering webs to form a laminated web, means for severing a blank of predetermined length from the laminated web, means for forming four mitred notches in the inner edge of the blank, to define the ends of flange sections, means for forming in the blank a longitudinal crease defining a line on which said sections may be bent to form a continuous internal flange, means for forming in the blank two inner and two outer transverse creases coinciding with the notches and defining lines on which the blank may be bent to form box corners, and mechanism for forming said blank into an internally flanged box body, said mechanism including means for applying glue to one end portion of the blank, means for bending the blank at the inner transverse creases therein, a turret having a box form, means for rotating the turret step by step and holding it in each of a series of working positions, means for transferring the partially bent blank to the form, when the latter is in its first position, means for bending the blank at the outer transverse creases, when the form is in its second position, to cause one end portion of the blank to overlap the others, means for exerting pressure on the blank while the form is in its second position, to press the overlapping portions together, the flange sections projecting above the form, and means for inwardly bending the flange sections when the form is in its third position, and pressing said sections against a gummed box bottom deposited on the form, so that a completed box is produced.

2. A box-making machine comprising mechanism for making, from a body web of boxboard and a covering web of thin paper, a flat laminated box-body blank having its outer longitudinal edge finished by an edge portion of the covering web, mitred notches in its bottom longitudinal edge, a longitudinal crease cooperating with said notches to define bendable flange sections, and scarfed end faces adapted to form a flush lap joint, said mechanism including means for uniting the body and covering webs to form a laminated web, means for locating the covering web so that one of its longitudinal edge portions constitutes a foldable finishing flap, means for folding said flap over an edge and a portion of one side of the body web, means for severing a blank of predetermined length from the laminated web, means for forming four mitred notches in the opposite edge of the blank, to define the ends of flange sections adapted to form a continuous internal flange, means for forming in the blank a longitudinal crease defining a line on which said sections may be bent to form a continuous flange, means for forming in the blank two outer and two inner transverse creases coinciding with the notches and defining lines on which the blank may be bent to form box corners, and means for skiving the opposite ends of the blank to form bevelled faces adapted to meet and form a flush lap joint.

3. A box-making machine as specified by claim 2 comprising also mechanism for forming said blank into an internally flanged box body, said mechanism including means for bending the blank at the inner transverse creases therein, means for applying glue to one of said bevelled faces, a turret having a box form, means for rotating the turret step by step and holding it with the form in each of a series of working positions, means for transferring the partially bent blank to the form when the latter is in its first position, means for bending the blank at the outer transverse creases, when the form is in its second position, to bring said bevelled faces into contact with each other, means for exerting pressure on the blank while the form is in its second position, to press the bevelled faces together, the flange sections projecting above the form, and means for inwardly bending the flange sections when the form is in its third position, and pressing said sections against a gummed box bottom deposited on the form, so that a completed box is produced.

4. A box-making machine comprising mechanism for simultaneously making, from a wide body web of boxboard, and a wide covering web of thin paper, two flat laminated box-body blanks, each of less than the width of said webs, and each having mitred notches in its inner longitudinal edge, a longitudinal crease cooperating with said flanges to define bendable flange sections, adapted to form a continuous internal flange, and end portions adapted to overlap and form a lap joint, said mechanism including means for uniting the body and covering webs, to form a wide laminated web, means for slitting and dividing the laminated web on it longitudinal median line, to form the inner edges of two blanks, means for transversely severing the divisions of the web to separate two blanks therefrom, means for simultaneously forming four mitred notches in the inner edges of the blanks, to define the ends of flange sections, means for simultaneously forming in the blanks longitudinal creases, defining lines on which said sections may be bent to form continuous internal flanges, and means for simultaneously forming in the blanks inner and outer transverse creases coinciding with the notches and defining lines on which the blanks may be bent to form box corners.

5. A box-making machine comprising mechanism for simultaneously making from a wide body web of boxboard, and a wide covering web of thin paper, two flat laminated box-body blanks, each of less than the width of said webs, and each having mitred notches in its inner longitudinal edge, defining the ends of flange sections, a longitudinal crease cooperating with said notches to define bendable flange sections, adapted to form a continuous internal flange, said blanks having bevelled end faces, adapted to form lap joints, said machine including means for uniting the body and covering webs, to form a wide laminated web, means for slitting the laminated web on its longitudinal median line, to form the inner edges of two blanks, means for transversely severing the divisions of the web to separate two blanks therefrom, means for simultaneously forming four mitred notches in the inner edges of the blanks, to define the ends of flange sections, means for simultaneously forming in the blanks longitudinal creases defining lines on which said sections may be bent to form continuous internal flanges, means for simultaneously forming in the blanks inner and outer transverse creases coinciding with the notches and defining lines on which the blanks may be bent to form box corners, and means for simultaneously skiving the opposite ends of the two blanks, to form bevelled faces adapted to meet and form flush lap joints.

6. A box-making machine as specified by claim 4, comprising also mechanism for simultaneously forming the two blanks into box bodies, said mechanism including means for applying glue to overlapping portions of the blanks, means for simultaneously bending the blanks at the outer creases thereon, two turrets each having a box form, means for simultaneously rotating the turrets step by step, and holding each form in each of a series of working positions, means for simultaneously transferring the partially bent blanks to the forms when the latter are in their first position, means for simultaneously bending the blanks at their outer transverse creases, when the forms are in their second position, to bring said overlapping portions into contact with each other, means for simultaneously exerting pressure on the blanks while the forms are in their second position, to press the overlapping portions together, the flange sections projecting above the forms, and means for simultaneously bending the flange sections, when the forms are in their third position, and pressing said sections against gummed box bottoms deposited on the former, so that two completed boxes are produced simultaneously.

7. A box-making machine comprising mechanism for making, from a body web of boxboard and a covering web of thin paper, a flat laminated body blank having mitred notches in its inner longitudinal edge, a longitudinal crease cooperating with said notches to define bendable flange sections, adapted to form a continuous internal flange, and end portions adapted to overlap and form a lap joint; said mechanism including means for uniting the body and covering webs to form a laminated web, means for severing a blank of predetermined length from the laminated web, means for forming four mitred notches in the inner edge of the blank, to define the ends of flange sections, means for forming in the blank a longitudinal crease defining a line on which said sections may be bent to form a continuous internal flange, means for forming in the blank two inner and two outer transverse creases coinciding with the notches and defining lines on which the blank may be bent to form box corners, and mechanism for forming said blank into an internally flanged box body, said mechanism including means for applying glue to one end portion of the blank, means for bending the blank at the inner transverse creases therein, a turret having a box form, means for rotating the turret step by step and holding it in each of a series of working positions, means for transferring the partially bent blank to the form, when the latter is in its first position, means for bending the blank at the outer transverse creases, when the form is in its second position, to cause one end portion of the blank to overlap the others, means for exerting pressure on the blank while the form is in its second position, to press the overlapping portions together, the flange sections projecting above the form, means for applying a gummed box bottom to the form, and means for inwardly bending the flange sections against the gummed box bottom so that a completed box is produced.

8. A machine for making covered boxes comprising means supporting a rolled body web of box board, means supporting a rolled covering web of thin paper, a pair of pressure rolls arranged to press the webs together and form a laminated web, continuously driven feed rolls engaging a portion of the covering web and adapted to feed said portion toward the pressure rolls, means associated with the said feed rolls for coating one side of the covering web with glue, idle rolls arranged to guide the covering web to the pressure rolls, and permit the formation of a loose depending bight in the covering web between the feed rolls and the pressure rolls, and intermittently operating feed rolls engaging the laminated web to feed the same between the pressure rolls, a portion of said bight being taken up by the intermittently operating feed rolls.

9. A machine for making covered boxes comprising means supporting a rolled body web of box board, means supporting a rolled covering web of thin paper, a pair of pressure rolls arranged to press the webs together and form a laminated web, continuously driven feed rolls engaging a portion of the covering web and adapted to feed said portion toward the pressure rolls, means associated with the said feed rolls for coating one side of the covering web with glue, idle rolls arranged to guide the covering web to the pressure rolls, and permit the formation of a loose depending bight in the covering web between the feed rolls and the pressure rolls, and means for varying the speed of the covering web feed rolls.

10. A machine for making covered boxes comprising means supporting a rolled body web of box board, means supporting a rolled covering web of thin paper, a pair of pressure rolls arranged to press the webs together and form a laminated web, continuously driven feed rolls engaging a portion of the covering web and adapted to feed said portion toward the pressure rolls, means associated with the said feed rolls for coating one side of the covering web with glue, idle rolls arranged to guide the covering web to the pressure rolls, and permit the formation of a loose depending bight in the covering web between the feed rolls and the pressure rolls, and rotary brushes adapted to fold an edge portion of the covering web across an edge and against a portion of one side of the body web.

11. A machine for making covered boxes comprising means supporting a rolled body web of box board, means supporting a rolled covering web of thin paper, a pair of pressure rolls arranged to press the webs together and form a laminated web, continuously driven feed rolls engaging a portion of the covering web and adapted to feed said portion toward the pressure rolls, means associated with the said feed rolls for coating one side of the covering web with glue, idle rolls arranged to guide the covering web to the pressure rolls, and permit the formation of a loose depending bight in the covering web between the feed rolls and the pressure rolls, means for severing a blank from the laminated web, means for feeding the blank longitudinally, a gang of punches adapted to form mitred notches in one edge of the blank, creasing rolls adapted to form a longitudinal crease across the apexes of the notches, means for feeding the blank edgewise, and creasing rolls cooperating with the last-mentioned feeding means in forming transverse creases extending from the notches across the blank.

12. In a machine for making covered boxes comprising means for making a blank having mitred notches in one edge, a longitudinal crease extending across the apexes of the notches and transverse creases extending from the notches across the blank, means for partially bending said blank on two of the transverse creases, said means including a fixed table, and a reciprocating head having bending rolls adapted to bend portions of the blank across the table.

13. In a machine for making covered boxes comprising means for making a blank having mitred notches in one edge, a longitudinal crease extending across the apexes of the notches and transverse creases extending from the notches across the blank, means for partially bending said blank on two of the transverse creases, said means including a fixed table, and a reciprocating head having bending rolls adapted to bend portions of the blank across the table, and means for skiving the ends of the partially bent blank, said means including grinding rolls and mechanism for oscillating said rolls across the ends of the blank.

14. In a machine for making covered boxes comprising means for making a blank having mitred notches in one edge, a longitudinal crease extending across the apexes of the notches and transverse creases extending from the notches across the blank, means for partially bending said blank on two of the transverse creases, said means including a fixed table, and a reciprocating head having bending rolls adapted to bend portions of the blank across the table, and means for bending the blank on the other transverse creases, the last-mentioned means including oscillatory jaws adapted to remove the partially bent blank from the table, a form arranged to receive the blank from said jaws, and mechanism cooperating with the form in completing the bending of the blank.

In testimony whereof I have affixed my signature.

ALBERT F. JONES.